UNITED STATES PATENT OFFICE.

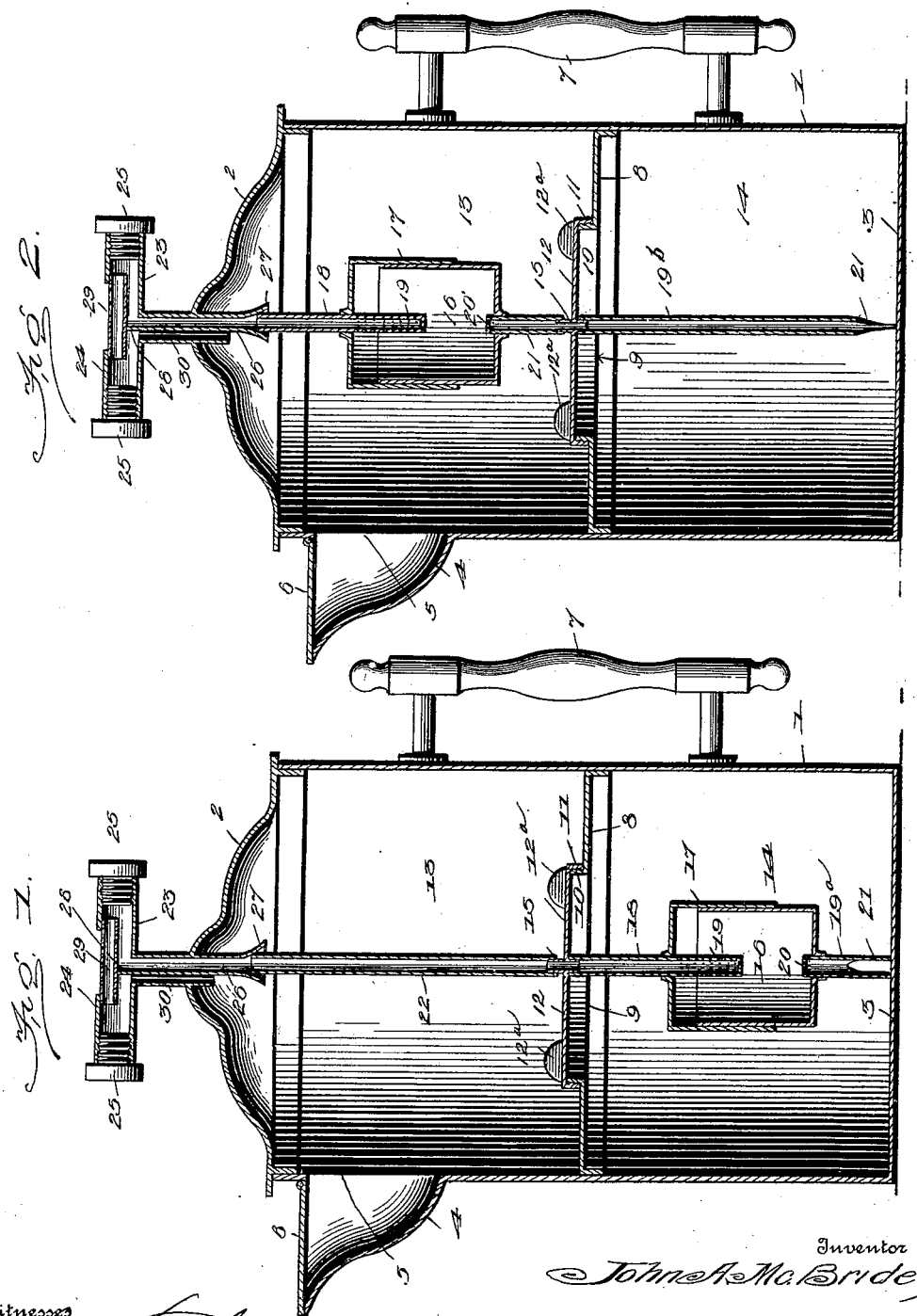

JOHN A. McBRIDE, OF ELKO, NEVADA.

COFFEE OR TEA POT.

SPECIFICATION forming part of Letters Patent No. 690,310, dated December 31, 1901.

Application filed March 16, 1901. Serial No. 51,524. (No model.)

*To all whom it may concern:*

Be it known that I, JOHN A. MCBRIDE, a citizen of the United States, residing at Elko, in the county of Elko and State of Nevada, have invented new and useful Improvements in Coffee or Tea Pots, of which the following is a specification.

My invention has relation to new and useful improvements in vessels or apparatus for making, infusing, or brewing tea, coffee, and similar beverages, and especially to that class or kind wherein a rapid circulation of the water or other liquid within the boiler is depended upon to extract the essence or substance of the article brewed.

The object is to provide a device of the character named which will be durable and simple in construction and efficient and practical in operation.

To these ends the invention consists in the features of construction to be more fully described in the following specification and the novelty whereof will be particularly pointed and distinctly claimed.

I have fully and clearly illustrated my invention in the accompanying drawings, wherein—

Figure 1 is a vertical central transverse section of my improved apparatus as arranged and adapted for brewing coffee, and Fig. 2 is a vertical central transverse section with its parts arranged for brewing tea.

Referring to the drawings, 1 designates a vessel of any suitable size and material and of such capacity as may adapt it to the uses for which it is intended. This vessel has the usual opening at the upper end provided with a cover or closure 2, and it also has a bottom 3, and may be either tapering from the bottom upward or a true cylinder. Projecting from the side of the vessel, adjacent to the top, is a pouring-spout 4, which communicates with the interior of the vessel through an opening 5 and which is provided with a hinged cover 6, as shown in the drawings. To the side of the vessel is secured a handle 7 in a well-known manner. Substantially intermediate of the top and bottom of the vessel is secured a horizontal plate 8, which is provided with a central circular aperture 9, surrounded by a vertical annular flange 10, having exterior screw-threads adapted to engage with the interior threads on an annular depending flange 11 of a circular cover 12, the two elements 8 and 12 constituting a partition which divides the vessel into upper and lower chambers 13 and 14. The cover 12 is provided with oppositely-disposed lugs $12^a$, serving as finger-pieces to facilitate turning the cover, and with a central aperture, through which is projected for a distance above and below the said cover a coupling-tube 15, the ends of which may be provided with exterior screw-threads to engage with and connect other tubes, as hereinafter described.

16 designates the lower portion of the brewing-receptacle, which consists of a metallic shell, over which is fitted in telescopic relation a section 17, having a central aperture in its top in which is fitted the lower portion of a tube 18, provided with perforations 19 in that part extending into the brewing vessel, substantially as shown in the drawings. The upper end of this tube 18 is coupled with and fitted to the lower depending end of the coupling-tube 15. In the bottom of the brewing-receptacle is a central aperture in which is fitted the upper end of a tube $19^a$, which opens into the brewing-receptacle through perforations 20. At the base of this tube are openings 21 in order that a circulation may be had through the perforations in the upper end of the tube into the receptacle 16. To the upper end of the tube 15 is fitted the lower end of a tube 22, having its upper end fitted into a flaring lower end of a tube downwardly projected from the handle of the cover.

23 designates the handle of the cover, consisting of a tube or cylinder 24, the ends of which are closed and sealed by threaded plugs 25. From the lower side of the handle 23 extends a tube 26, having a bell-shaped or flaring lower end portion 27, into which the upper end of the tube 22 fits and seals. At the upper end of the tube 26 one side thereof constitutes a partition 28, dividing the tube of the cover-handle into two parts, as shown. In the partition is supported a sight-tube 29, of glass or like material, to which visual observation may be had through a suitable aperture in the top of the handle, substantially as shown and the material, which finds its way up through the tube 26 into the chamber of the handle, into which it opens and thence is carried through the tube 29 into the other apartment of the handle, finds its way into the upper compartment of the vessel through a depending tube 30, opening from the cover-handle through the cover or lid into the vessel, substantially as shown in the drawings.

The description thus far has been devoted particularly to the invention as applied for brewing coffee, and the operation is as follows: The cover 2 of the vessel is lifted or removed, the tube 22 is disconnected from the short tube 15, and the cover 12 of the transverse partition 8 is released, carrying with it the brewing cup or receptacle for the material and the tube 18. The receptacle for the material may then be separated and the lower portion supplied with the required quantity of granulated coffee. The lower part of the vessel is then filled with water and all the parts reassembled and replaced, as shown in the drawings. The bottom of the vessel is then subjected to heat sufficient to produce ebullition. The water immediately enters the openings 21, passes through the tube 19$^a$ into the brewing vessel through the perforations 20, and by the time the water in the lower compartment 14 reaches the boiling-point the coffee in the receptacle 16 will have become sufficiently softened to give all the best qualities of the coffee. When steam is generated in the lower compartment 14, the pressure thereof will force the water up through the tube 19$^a$, thence through the coffee in the telescoping vessel, from whence it continues in an upward course through the tubes 18 and 22, and then through the tube 26 into the handle of the cover, from whence it courses through the glass tube 29 down through the tube 30 into the reservoir or upper compartment 13.

Without departing from the principle of my invention it may be adapted for the purposes of brewing tea by simply transferring the receptacle 16 from the compartment 14 of the main vessel into the compartment 13, as shown in Fig. 2. It will also be observed that in the transposition of elements, as shown in Fig. 2, the tube which extends into the lower compartment extends for the entire height thereof, as shown at 19$^b$, and connects with tube of the tea-receptacle by means of the short tube in the cover of the partition 8. This rearrangement of the parts becomes necessary in order that the water may not come in contact with the tea until it reaches the boiling-point, so that as the water is forced up through the tubes into the tea-receptacle it reaches the tea when hot and serves the purpose of steeping it, and in this condition the water is forced up through the tube-conduits and handle of the cover, the same as the process of making coffee, as illustrated in Fig. 1.

What I claim is—

1. In a tea and coffee pot, a vessel divided into upper and lower compartments by a transverse partition, a brewing-receptacle in one of the compartments having a tube communicating with the lower compartment of the vessel, a cover on the vessel having a handle divided into two communicating parts, into one of which the water from the vessel rises and from the other of which the water descends, and a sight-tube in the handle.

2. In a coffee and tea pot, a suitable vessel, a brewing-receptacle within the vessel provided with a tube through which liquid may ascend, a handle divided into two communicating compartments into one of which the said tube communicates, a sight-tube in said handle and a discharging-tube from the said handle leading into the interior of the vessel.

3. In a coffee and tea pot, a vessel divided into upper and lower compartments by a transverse partition, an opening in the partition, a closure to the opening, a brewing-receptacle in one of the compartments having a tube communicating with the lower compartment of the vessel, a cover on the vessel having a handle divided into two communicating parts, into one of which the water from the vessel rises and from the other of which the water descends, and a sight-tube within the handle.

4. In a coffee and tea pot, a vessel divided into two compartments by a transverse partition, an opening in the partition, a closure for the opening, a coupling-tube projected through the closure, a brewing-receptacle in the lower chamber of the vessel, a tube connecting the receptacle and the coupling-tube, a cover on the vessel provided with a handle divided into two communicating parts, a tube connecting one of the said parts and the coupling-tube in the cover of the transverse plate, and a sight-tube within the handle.

5. In a coffee and tea pot, a vessel divided into an upper and lower compartment by a transverse partition, a brewing-receptacle in the lower compartment provided with a depending tube adapted to rest against the bottom of the vessel, a tube ascending from the brewing-receptacle, a cover for the vessel provided with a handle divided into two communicating compartments, one of which communicates with the ascending tube of the brewing-receptacle and the other of which opens into the upper receptacle, and a sight-tube within the handle.

6. In a coffee and tea pot, a vessel divided into upper and lower compartments by a transverse partition, an opening in the partition, a closure to the opening, a coupling-tube projected through the said closure, a brewing-receptacle in the lower compartment of the vessel, a tube depending from the base of the brewing-receptacle, a telescoping cover to the receptacle, a tube secured in the top of the cover, one end of which extends into the receptacle and the other of which connects with the coupling-tube in the cover of the opening in the partition, a cover to the vessel having a handle divided into two compartments, a tube connecting one of the compartments with the said coupling-tube, and a sight-tube within the handle.

7. In a coffee and tea pot, the combination with a vessel having upper and lower compartments and circulating-tubes extending through both compartments, of a cover to the vessel, a handle to the cover divided into communicating compartments one of which is formed with a tube communicating with the tubes of the vessel, a sight-tube between the compartments of the handle and a discharge-tube communicating from the handle through the cover into the upper compartment of the vessel.

8. In a tea and coffee pot, the combination with a vessel having upper and lower compartments and circulating-tubes extending through both compartments, of a cover to the vessel, a handle to the cover divided into communicating apartments one of which is formed with a tube communicating with the tubes of the vessel, a transparent tube arranged in the said handle through which the fluid is transmitted from the one apartment to the other and a discharge-tube leading from the handle through the cover of the vessel into the upper compartment.

9. The combination of a coffee or tea pot divided into upper and lower compartments and circulatory tubes in the compartments, of a cover provided with a handle formed with a circulatory tube communicating with the sight-tube of the vessel, and a discharge-tube communicating with the interior of the upper compartment of the vessel.

10. The combination in a coffee or tea pot, having upper and lower compartments and tubes communicating between the said compartments, of a detachable cover formed with a handle divided into two compartments connected by a sight-tube and a depending tube setting over the end of the tube of the vessel, a discharge-tube leading from the handle into the upper compartment of the vessel, a tube in the handle of the cover through which the liquid circulates from one apartment in the handle to the other and threaded plugs to close the ends of the tube of the handle.

11. The combination with the cover of a coffee or tea pot, of a cylindrical handle having a horizontally-disposed sight-tube and vertically-depending tubes communicating with the interior of the vessel, one of which tubes constitutes a feed-tube from the interior of the coffee-pot and the other of which constitutes a discharge-tube into the interior of the coffee-pot.

In testimony whereof I affix my signature in presence of two witnesses.

JOHN A. McBRIDE.

Witnesses:
M. H. MILLER,
R. H. MALLETT.